Sept. 13, 1949.   J. ROCK, JR   2,481,684
WORK HOLDER
Filed May 10, 1948
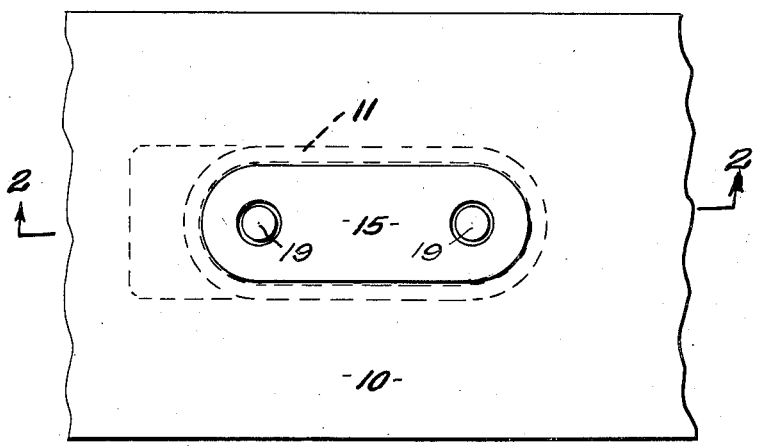
Fig-1-
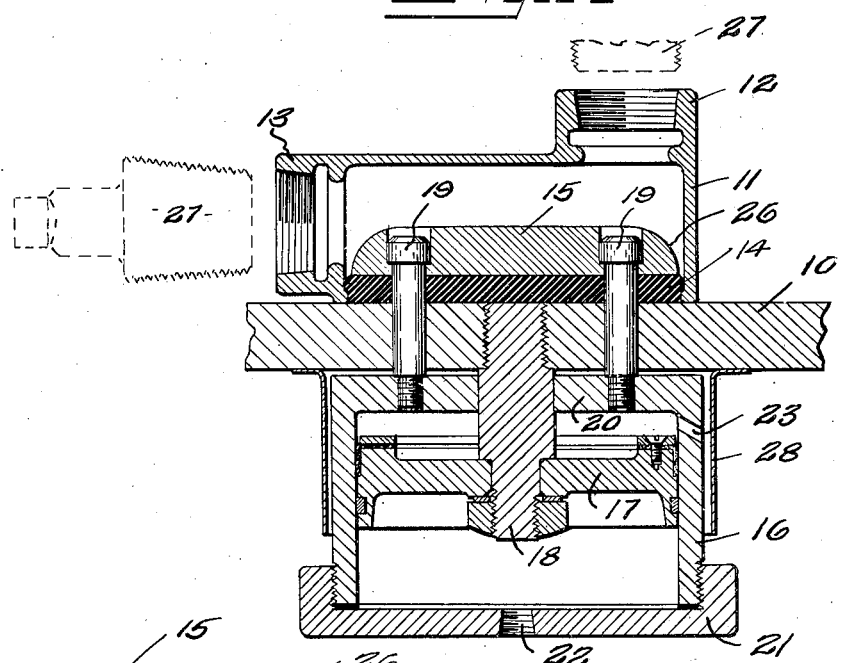
Fig-2-
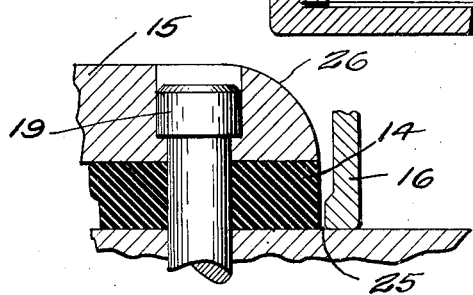
Fig-3-
INVENTOR.
Joseph Rock Jr.
BY Bodell & Thompson
ATTORNEYS.

Patented Sept. 13, 1949

2,481,684

UNITED STATES PATENT OFFICE 2,481,684

WORK HOLDER

Joseph Rock, Jr., North Syracuse, N. Y., assignor to Crouse-Hinds Company, Syracuse, N. Y., a corporation of New York Application May 10, 1948, Serial No. 26,211

2 Claims. (Cl. 279—4)

1

This invention relates to a device for automatically holding a work piece on a support while a machining operation is performed on the work.

The invention has as an object a work holder embodying a particularly economical structure including power actuated means for firmly gripping the work without injury thereto, and holding the work piece secure for the machining operation but permitting a slight universal movement to the work piece.

The invention has a further object a work holder embodying a structure whereby the work piece may be quickly and conveniently positioned on, and removed from, the holder.

The invention consists in the novel features and in the combinations and constructions hereinafter set forth and claimed.

In describing this invention, reference is had to the accompanying drawings in which like characters designate corresponding parts in all the views.

Figure 1 is a top plan view of a structure embodying my invention.

Figure 2 is a vertical sectional view taken on line 2—2, Figure 1, illustrating the work holder operatively holding a work piece.

Figure 3 is an enlarged fragmentary sectional view of the work engaging member, compression plate and contiguous portion of the support, illustrating the parts in released condition.

The work holder comprises a support 10. As here shown, the support 10 is in the nature of a relatively heavy, rigid, flat metal plate. In practise, this support 10 constitutes a part of the machine performing the work operation.

The work piece 11, illustrated in the drawings, is in the nature of an electric conduit outlet box having hubs 12 and 13, the box being formed, in the side opposite the hub 12, with an oblong opening.

A work engaging member 14 is mounted upon the upper surface of the support plate 10. This member is formed of resilient material, such as rubber or other elastic material, and its periphery is complemental to the work piece or, as in this instance, to the opening in the side of the work piece.

A compression plate 15 is superimposed upon the work engaging member 14, overlying the same, and being coextensive therewith. This plate 15 is operable, when moved toward the support plate 10, to compress the work engaging member 14 and cause the same to expand laterally into engagement with the interior of the work piece 11, as illustrated in Figure 2.

2

The device includes power actuated means for effecting movement of the compression plate 15 towards the support 10. This means consists of a cylinder 16 and a piston 17. The piston is fixedly mounted upon a stud 18 secured to and depending from the under side of the plate 10. The cylinder 16 is carried by screws 19 depending from the compression plate 15 and being threaded into the top wall 20 of the cylinder. The screws 19 are slidably mounted in the plate 10. The cylinder 16 is provided with an end closure 21 apertured, as at 22, to receive a conduit connected to a controlled source of fluid under pressure. The upper portion of the cylinder is provided with a suitable breather port 23.

In operation, the work piece 11 is placed upon the plate 10, with the work engaging member 14 and the compression plate 15 extending into the interior of the work piece. Fluid pressure is then applied through the aperture 22, causing the piston to move downwardly effecting compression movement of the plate 15 toward the support 10, whereupon the peripheral portion of the work engaging member is expanded into engagement with the work piece, as shown in Figure 2.

The plate 15 and the work engaging member 14 in normal condition are, in size and shape, complemental to the work piece 11, these parts being only slightly smaller in dimension to provide a slight clearance 25 between the periphery of these members and the opening in the work piece to facilitate positioning and removal of the work piece. The plate 15, in addition to effecting compression of the member 14, serves as a guide for positioning the work on the support 10, and to this end the peripheral portion of the plate is rounded, as at 26.

The expansion of the member 14 into engagement with the work piece securely holds the same on the support 10 during the machining operation as, for example, during the tapping of the hubs 12, 13, as by taps indicated in dotted outline at 27. However, due to the resilient character of the work engaging member, a slight universal movement of the work piece is permitted. This is found to be particularly desirable in tapping and reaming operations, as it permits the cutting tools to center in the bores in which they are operated. This movement is limited by engaging of the work piece with the periphery of the compression plate 15.

Upon release of the pressure from the lower portion of the cylinder 16, the resilient member 14 contracts to its original dimension, as shown in Figure 3, whereby the work piece can be conveniently removed from the support 10. The cylinder 16 is encircled by a cylindrical shield 28 depending from the under side of the plate 10, the purpose of which is to minimize the entrance of foreign material through the breather port 23.

This device has been found to be particularly satisfactory in use on machines for automatically performing operations on work pieces, in which instance the plate 10 forms part of a conveyor system which functions to move the work piece 11 in juxtaposition to the tools 27 and, after the performance of the machine operation, to advance the work pieces to a discharge station.

What I claim is:

1. A work holder for holding a work piece comprising a rigid support having a flat surface adapted to receive and support the work piece, a work piece engaging member formed of resilient material mounted on said support, the periphery of said member being shaped complemental to said work piece, a compression plate overlying said member and being coextensive therewith, and being movable toward said support to compress said member, said member being operable upon such compression to expand into engagement with the work piece, and power actuated means mounted on the under side of said support and operable to effect compression movement of said plate.

2. A work holder for holding a work piece formed with a recess extending inwardly from one side thereof, a rigid support having a flat surface adapted to receive the apertured side of the work piece, a work piece engaging member formed of resilient material mounted on said support, the periphery of said member being shaped complemental to the aperture in said work piece, a rigid compression plate overlying said work engaging member and being coextensive therewith and movable toward said support to compress said member, said member being operable upon such compression to expand into engagement with the work piece, and power actuated means mounted on the under side of said support and being operable to effect compression movement of said plate.

JOSEPH ROCK, Jr.

No references cited.